Sept. 25, 1962 J. T. MATTINGLY 3,056,028
NEUTRON SHIELDING STRUCTURE
Filed May 3, 1960
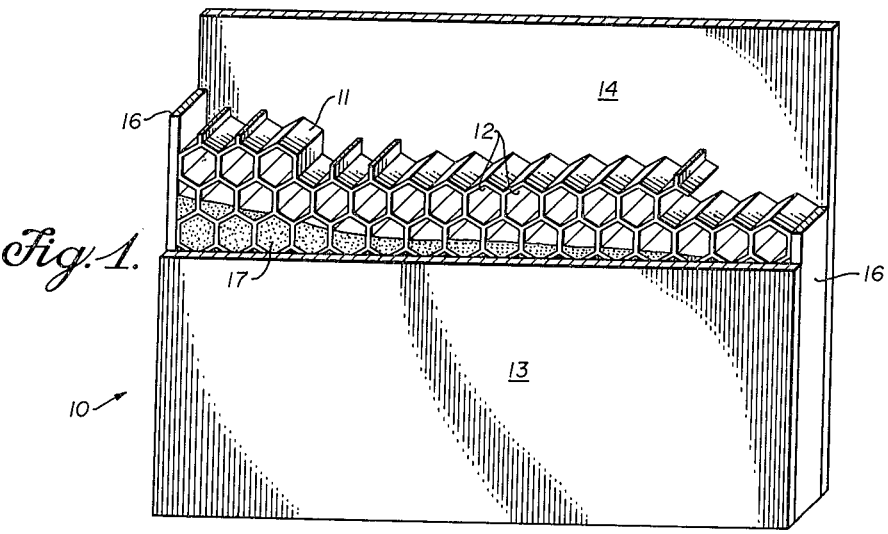
Fig. 1.
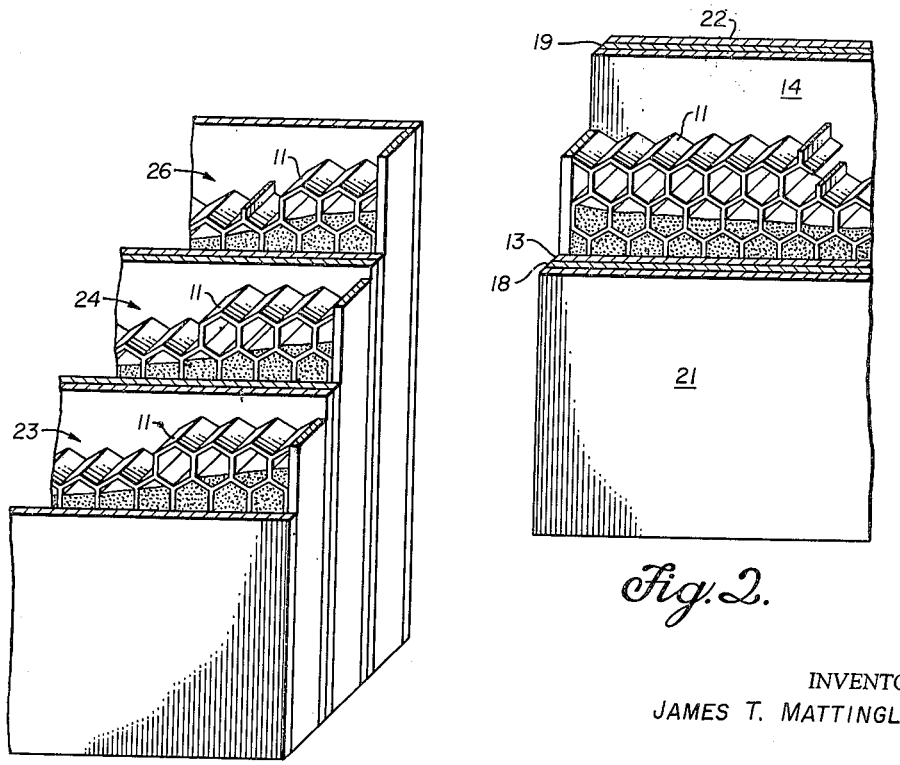
Fig. 2.
Fig. 3.
INVENTOR
JAMES T. MATTINGLY
BY Roland A. Anderson
ATTORNEY

United States Patent Office 3,056,028
Patented Sept. 25, 1962

3,056,028
NEUTRON SHIELDING STRUCTURE
James T. Mattingly, Danville, Calif., assignor to the United States of America as represented by the United States Atomic Energy Commission
Filed May 3, 1960, Ser. No. 26,664
8 Claims. (Cl. 250—108)

The invention relates to neutron shielding structures and, more particularly, to a lightweight neutron shielding structure having a high strength-to-weight ratio.

In current reactor shielding design practice, the most commonly used neutron shielding materials are concrete and water. Both these materials are effective neutron shields because of their high hydrogen content (cured concrete contains approximately 10% water by weight). Concrete shields are used in most large power reactors, and the water shield is best exemplified by the "swimming pool" type reactor. Unfortunately, the excellent neutron absorption properties of water and concrete are not matched by their mechanical characteristics. Water will not support a shear stress of any kind, and concrete, unless internally reinforced or externally braced, is only reliable in pure compressive stress. As a consequence, neither water nor concrete can be incorporated into a shielding design without resorting to heavy containment and reinforcing structures. With the current interest in small portable nuclear reactors, particularly for use as aircraft propulsion plants, there has developed a need for a lightweight neutron shield.

In accordance with the present invention, such a lightweight shield is provided by utilizing a core, characterized by having a large proportion of void areas and surface sheaths bonded thereto, to construct wall portions of the shield. Neutron absorber materials are disposed in the void areas, and moderator in the sheath areas, so as to cooperatively provide high neutron absorbing efficiency, and to supply or augment mechanical and structural properties of the shield. Consequently, the invention provides effective neutron shielding embodied in a structure having a high strength-to-weight ratio.

Accordingly, one object of the invention is to provide a lightweight neutron shielding structure having a high strength-to-weight ratio.

Another object of the invention is to provide a neutron shielding structure that can be incorporated into a reactor design as a load-bearing structural member.

A further object of the invention is to provide a lightweight neutron shielding structure suitable for use in a portable nuclear reactor.

Other objects and advantages of the invention will become apparent upon consideration of the following specification, when taken in conjunction with the accompanying drawing, of which:

FIGURE 1 is a perspective view of a neutron shielding structure in panel form;

FIGURE 2 is a perspective view of a neutron shielding structure having laminated facing sheets; and FIGURE 3 is a perspective view of a laminated neutron shielding structure, comprising several shielding panels laminated together.

In general, portable reactors are constructed within a metallic vessel in the form of a circular cylinder, cube, prism, sphere, etc. The shield is generally fitted about such a nuclear vessel so as to totally enclose core regions of the reactor, in order to prevent leakage neutrons from affecting instruments, structures and personnel in the reactor area. Accordingly, the general configuration of the shield may be varied to meet shape requirements of the reactor; however, the essential structure of the shield walls are similar in all cases, and the description will make reference to structural segments for purposes of illustration.

More particularly, a panel segment 10 of such a shield is illustrated in FIGURE 1, wherein the aforesaid core is provided in the form of a honeycomb structure 11. The honeycomb structure is constructed to provide a large number of voids 12 separated by thin walls forming a continuous matrix. Voids 12 extend in a direction perpendicular to the plane of the core. The voids are utilized in a manner which is described more fully hereinafter. The honeycomb core 11 is disposed between and bonded to parallel planar facing sheets 13 and 14, thereby providing rigidity, strength and closure of the voids 12. The honeycomb cell voids 12 are oriented perpendicularly to facing sheets 13 and 14. Enclosure of the core 11 is completed with wall strip 16 disposed around and bonded to the perimeter of the facing sheets and abutting portions of the honeycomb core 11.

The term "honeycomb" is used herein to mean a core structure in the form of an ordered network of regular polyhedral cells, wherein each cell comprises a closed segmented wall and a void space defined by said wall. The structure described above may also be termed a "honeycomb sandwich" used to mean a honeycomb core structure disposed between and bonded to two parallel planar facing sheets, with the edges of the honeycomb cells oriented perpendicularly to the facing sheets. Information concerning methods of designing and producing such structures is available from various sources. A comprehensive discussion of the application of honeycomb sandwich to the design of lightweight rigid structures is given by E. W. Kuenzi, "Structural Sandwich Construction," Forest Products Laboratory P & E 121, 1956. The mechanical properties of honeycomb sandwich are presented in American Society for Testing Materials, Special Technical Publication No. 118 (1951). An outline of honeycomb production methods is provided by A. Marshall in the May 15, 1958, issue of "Machine Design." In accordance with the invention, a low bulk density neutron absorber, for example, in the form of a powder 17, is disposed within the voids 12. Likewise, one or both of the facing sheets may constitute a neutron moderator and may include a neutron absorber to provide the essential neutron shielding properties as discussed more fully hereinafter.

As distinguished from prior art honeycomb sandwich construction, in the shielding panel shown in FIGURE 1, structural elements perform multiple functions. The facing sheets and the neutron absorbing powder cooperatively contribute to the structural and neutronic properties of the shielding panel. The structural function of the facing sheets is to carry the main portion of the bending load applied to the panel. The neutronic function of the facing sheets is to decrease the energy of incident neutrons to levels which correspond with absorption maxima in the absorber powder. The absorber powder functions neutronically by absorbing or otherwise removing neutrons from the incident flux. This absorption process is highly efficient, since the neutrons have already passed through a layer of moderator, i.e., the facing sheet, before entering the absorber powder. As stated previously, the absorber powder also performs a structural function. The presence of numerous small particles, which have relative freedom of movement inside the honeycomb cells, acts as a kinetic energy reservoir for the shielding panel. Vibrational energy applied to the panel is converted into translational kinetic energy of the absorber particles. The over-all effect is that the absorber powder substantially "damps out" panel vibration. Another structural function of the absorber powder is to provide the honeycomb cells with increased resistance to shearing stress. When purely compressive loads are applied to honeycomb sandwich, the cell walls act as numerous small columns supporting a load acting parallel to their length. However, when shearing stress is applied to honeycomb sandwich, the cell walls tend to distort and buckle under the load. The absorber powder of the present invention acts structurally to stabilize the honeycomb cells against the buckling effects produced by shear loads.

Another feature of the invention is that the structural properties of the shielding panel are independent of the chemical composition of the absorber powder. This means that the absorber powder can be chosen solely on the basis of its neutron absorption characteristics. In the practice of the invention, it is intended that neutron energies shall be reduced to the thermal level, i.e., 0.025 electron volt, before entering the absorber powder. For the absorption of thermal neutrons, the most suitable absorbers are boron and lithium compounds. Boron and lithium are unique, in that they undergo an (n, α) reaction, rather than the much more common (n, γ) reaction, viz., $$_5B^{10} + {}_0n^1 \rightarrow {}_3Li^7 + \alpha$$

and $$_3Li^6 + {}_0n^1 \rightarrow {}_1H^3 + \alpha$$

As a consequence, the absorption of neutrons by boron or lithium does not result in the emission of high energy gamma rays which require additional shielding. Another factor dictating the choice of boron and lithium as absorbers is their relatively high thermal neutron absorption cross sections; 755 barns and 945 barns, respectively.

The choice of a particular absorber compound depends largely on the intended application of the shielding structure. However, several requirements applying to all absorbers can be stated:

(1) High weight percentage of boron or lithium
(2) Low density
(3) Elements in compound, other than boron or lithium, should not emit high energy gamma rays following neutron absorption
(4) Radiation stability
(5) Thermal stability
(6) Chemical inertness
(7) Relatively inexpensive
(8) Easily obtainable in large quantities The properties of several possible absorber compounds are listed in Table I.

*Table I*

| Compound | Wt. percent B or Li | Density, gms./cc. | Melting Point, °C. |
| --- | --- | --- | --- |
| B | 100.0 | 2.34 | 2,300 |
| $B_4C$ | 78.5 | 2.50 | 2,450 |
| $B_2O_3$ | 31.4 | 1.84 | 450 |
| $CaB_6$ | 62.4 | 2.45 | 2,235 |
| $Li_2CO_3$ | 19.0 | 2.10 | 618 |
| LiOH | 29.2 | 1.43 | 450 |
| $LiBO_2$ | 22(B) 14(Li) | 1.30 | 840 |
| $Li_2O$ | 46.5 | 2.00 | 1,750 |

For most applications of the invention, including shielding of high temperature propulsion reactors, it is intended that powdered B and $B_4C$ be used as neutron absorbing cell fillers. In addition to its high melting point and high percentage of boron, $B_4C$ possesses the added advantage of containing 21.5% by weight of carbon. The carbon nuclei act as moderators to reduce the energies of any fast neutrons that may have traversed the facing sheets without being moderated therein.

As mentioned previously, the facing sheets perform two functions. First, they bear the main portion of the bending load applied to the shielding structure. Second, they moderate fast neutrons to thermal energies, so that the thermal neutrons will be readily absorbed by the powder filling the honeycomb cells. To provide such functions in an optimum fashion, the facing sheets are preferably made of beryllium. Among the solid elements, beryllium is the best neutron moderator, having a low thermal absorption cross section and moderating ratio 10% greater than that of carbon. The ultimate tensile strength of beryllium, 45,000 p.s.i., is greater than that of aluminum, and a shielding structure made with beryllium facing sheets can support a considerably greater load than the same structure made with aluminum facing sheets. Furthermore, if a shielding structure with beryllium facing sheets is placed adjacent a bare reactor core, the beryllium facing will perform the added function of a reflector, thereby increasing the efficiency of neutron utilization within the core. In this manner, the facing sheet substitutes for at least a portion of the reactor reflector-moderator structure.

For applications imposing less severe operating conditions than those encountered in the shielding of high temperature reactors, the shielding structure can be provided with inexpensive laminated facing sheets. Referring to FIGURE 2, there is shown a neutron shielding structure as in FIGURE 1 wherein facing sheets 13 and 14 are laminated to additional moderator panels 18 and 19, respectively. The moderator panels are in turn bonded to cover sheets 21 and 22.

In the embodiment of the invention illustrated in FIGURE 2, the moderator panels are made of a thermosetting synthetic resin. The carbon and hydrogen nuclei present in the resin moderate the energies of neutrons incident upon the panel. The resin must be of the thermosetting type in order to avoid mechanical deformation and strain induced by thermal effects. There are several resins available that are suitable for use in such a laminated structure, e.g., cross-linked polystyrene polymers, epoxy resins, phenol-formaldehyde condensation polymers, and various styrene-alkyd polyesters. These materials retain their mechanical strength and chemical identity at temperatures up to 200° C. For operating temperatures above this point, it is necessary to employ the solid beryllium type of facing sheet which has been discussed previously.

The function of facing sheets 13 and 14, and cover sheets 21 and 22, is to augment the relatively low flexural strength of the synthetic resin moderator panels 18 and 19. The tensile strengths of synthetic resins are generally less than 10,000 p.s.i. Therefore, in order to employ the embodiment of FIGURE 2 as a load bearing member in a shielding design, it is necessary to reinforce the moderator panels. If, as shown in FIGURE 2, the moderator panels are laminated between relatively thin sheets of high tensile strength material, the over-all flexural strength of the shielding structure is considerably increased. Aluminum sheet is a preferred material for use as a moderator panel reinforcer, as it is inexpensive, has suitable nuclear properties, and has an adequate tensile strength, viz., 35,000 p.s.i.

In another embodiment of the invention, several shielding panels of the character described above can be laminated together to give a composite structure of greatly increased mechanical strength and neutron absorption capacity. Referring now to FIGURE 3, there is shown such a composite shielding structure, comprising individual shielding panels 23, 24 and 26 corresponding to either of the embodiments illustrated in FIGURES 1 and 2, supra, that have been laminated together along their respective adjacent facing sheets. For operating temperatures below about 200° C., the panels can be bonded together with an organic adhesive, using procedures which are well known in the woodworking and plastic industries. For sustained operation at higher temperatures, the panels can be brazed or welded together.

In addition to its increased structural strength, the laminated shielding structure of FIGURE 3 possesses another advantage: each layer of honeycomb cells can be filled with a different absorber powder than the layer adjacent to it. For example, in FIGURE 3, panel 23 could be filled with powdered BeO, panel 24 with $B_4C$, and panel 26 with B. Neutrons incident upon panel 23 would be moderated by the BeO powder before entering panel 24. The $B_4C$ powder within panel 24 would provide additional moderation by the carbon nuclei, and absorption of thermalized neutrons by the boron nuclei. The boron powder in panel 26 would absorb any neutrons that had escaped absorption by the $B_4C$ powder in panel 24.

Although several embodiments of the invention have been described, these are merely illustrative, and various modifications can be made therein without departing from the spirit and scope of the invention as defined by the following claims:

What is claimed is:

1. A laminated neutron shielding structure comprising a plurality of shielding panels laminated together, each of which panels comprises a honeycomb core, neutron absorbing powder disposed in the voids of said honeycomb core, planar facing sheets of neutron moderating material disposed in contact with said honeycomb core and bonded thereto, and an edge strip disposed on the perimeter of said facing sheets and bonded thereto.

2. A neutron shielding structure comprising an ordered network of polyhedral cells wherein each cell comprises a closed segmented wall and a void space defined by said wall, neutron absorbing powder disposed within said void spaces, planar wall sheets disposed perpendicularly to the edges of said polyhedral cells and bonded to said cell network, and an edge strip disposed along the perimeter of said wall sheets and bonded thereto.

3. The neutron shielding structure defined in claim 2, wherein the neutron absorbing powder includes boron.

4. The neutron shielding structure defined in claim 2, wherein the neutron absorbing powder includes boron carbide.

5. The neutron shielding structure defined in claim 2, wherein the neutron absorbing powder includes a material selected from the group consisting of $B_2O_3$, $CaB_6$, $Li_2CO_2$, LiOH, $LiBO_2$, and $Li_2O$.

6. The neutron shielding structure defined in claim 2, wherein the wall sheets are constructed of beryllium and the neutron absorbing powder includes boron.

7. The neutron shielding structure defined in claim 2, wherein the wall sheets are constructed of berryllium and the neutron absorbing powder includes boron carbide.

8. The neutron shielding structure defined in claim 2, wherein each of the wall sheets comprises a panel of hydrogenous resin laminated between two sheets of a material having a tensile strength substantially greater than that of said resin.

References Cited in the file of this patent
UNITED STATES PATENTS

| | | |
|---|---|---|
| 2,744,042 | Pace | May 1, 1956 |
| 2,773,459 | Sechy | Dec. 11, 1956 |
| 2,853,624 | Wigner et al. | Sept. 23, 1958 |